United States Patent

Deschamps et al.

[15] 3,649,190
[45] Mar. 14, 1972

[54] PROCESS FOR THE RECOVERY OF AMMONIA, SULFUR DIOXIDE, CARBON DIOXIDE AND HYDROGEN SULFIDE FROM GAS STREAMS AND FROM AMMONIUM SULFITES, SULFIDES AND CARBONATES

[72] Inventors: Andre Deschamps, Chatou; Philippe Renault, Noisy ie Roi, both of France

[73] Assignee: Institut Francais Dy Petrole Des Carburants Et Lubrifiants, Rueil Malmaison, France

[22] Filed: Mar. 20, 1969

[21] Appl. No.: 808,804

[30] Foreign Application Priority Data

Mar. 24, 1968 France..............................146618

[52] U.S. Cl. .................................23/193, 23/2 R, 23/150, 23/177, 23/181
[51] Int. Cl. ..................C01c 1/00, C01b 31/20, C01b 17/48
[58] Field of Search .................23/193, 181, 2 R, 177 R, 2 A, 23/178, 150

[56] References Cited

UNITED STATES PATENTS 2,899,274   8/1959   Smith et al....................................23/2

OTHER PUBLICATIONS

Lange' s Handbook of Chemistry, (1956), pp. 424– 425: Handbook Publishers, Inc., Sandusky, Ohio

*Primary Examiner*—Oscar R. Vertiz
*Assistant Examiner*—Hoke S. Miller
*Attorney*—Millen, Raptes & White

[57] ABSTRACT

A process for separating volatile bases (B'), e.g., $NH_3$ and weak volatile acids (A'H), e.g., $H_2S$ from their salts or the liquid or gaseous dissociation products thereof, comprising, in a first step, contacting these salts or dissociation compounds with a nonvolatile AH acid, e.g., benzoic acid, in the presence of at least one liquid phase, at such a temperature and pressure that the volatile acid (A'H) is evolved in the form of a gas which is practically free of base (B') and acid (AH), and then, in a second step, increasing the temperature or reducing the pressure to liberate the volatile base (B) and regenerate the acid (AH), said liquid phase containing an alcohol having from six to 50 carbon atoms per molecule, an ester of said alcohol, a polyalcohol having from two to 50 carbon atoms and two to 10 OH groups per molecule, an ester, ester or ester-ester of said polyalcohol, or a compound of the formula:

$$R_1 - O - (R_2 - O)_n - R_3$$

in which each of $R_1$ and $R_3$ represents a hydrogen atom, a monovalent hydrocarbon radical having one to 20 carbon atoms or a monovalent radical R' CO in which R' is a monovalent hydrocarbon radical having one to 20 carbon atoms, $R_2$ is a bivalent hydrocarbon radical having two to 10 carbon atoms and $n$ is an integer from two to 50, the acid (AH) having under normal atmospheric pressure a boiling or sublimating point at least 50° C. higher than that of the acid (A'H).

15 Claims, 1 Drawing Figure

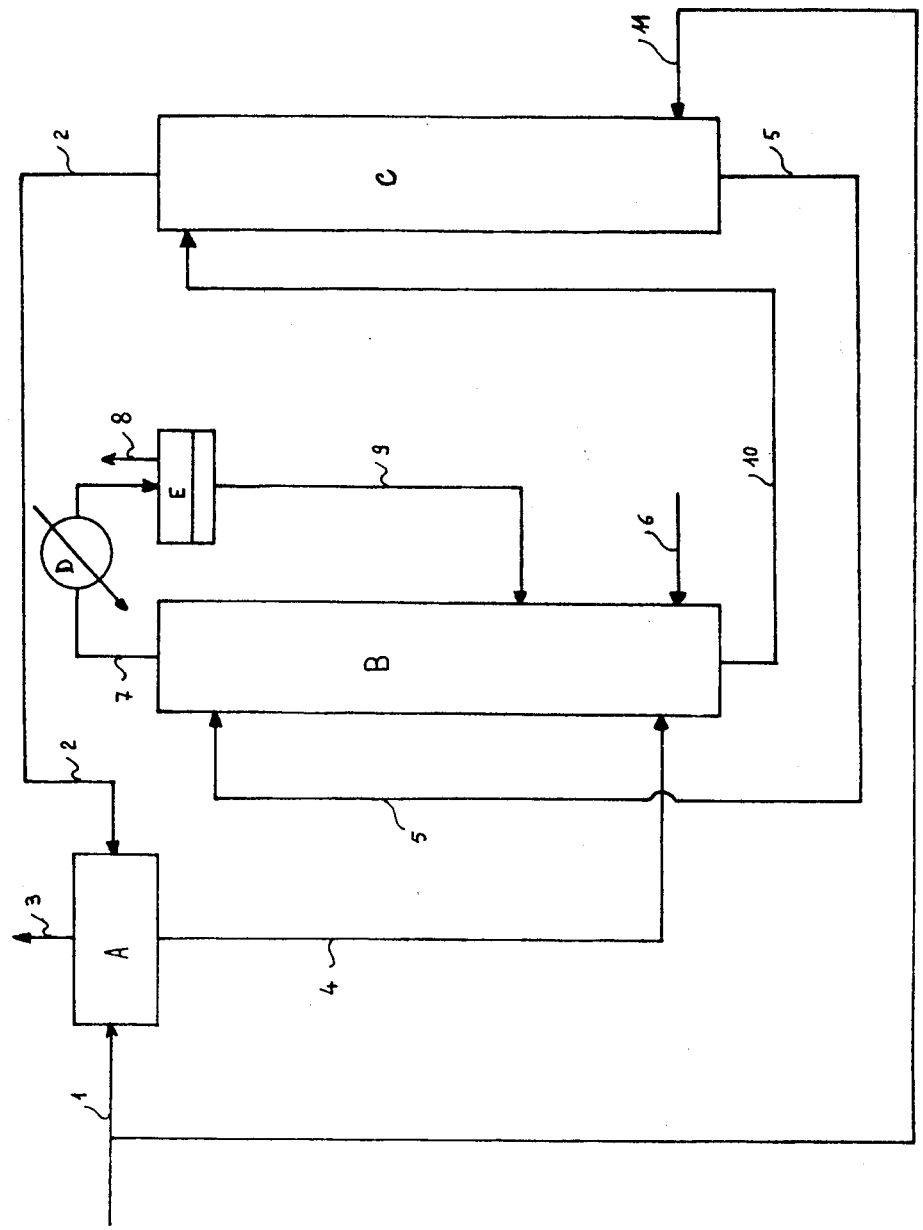

A PROCESS FOR THE RECOVERY OF AMMONIA, SULFUR DIOXIDE, CARBON DIOXIDE AND HYDROGEN SULFIDE FROM GAS STREAMS AND FROM AMMONIUM SULFITES, SULFIDES AND CARBONATES

This invention relates to a new process for separating and recovering volatile bases and volatile acids from their salts or their dissociation products in the liquid or gaseous state.

More particularly this invention relates to a process for recovering ammonia and sulfur dioxide or hydrogen sulfide from, respectively, ammonium sulfites or sulfides.

This process is carried out in two steps. In a first step, usually carried out at a moderate temperature, a salt, as described above, is contacted with a less-volatile (or non-volatile) acid in a liquid phase containing at least one solvent such as hereinafter defined; during this step, the volatile acid is evolved in the gaseous state while there is formed a salt of the less-volatile acid. In a second step, which is carried out at a higher temperature and/or lower pressure than the first step, the salt resulting from the first step is decomposed, in order to liberate the volatile base in the gaseous state and regenerate the liquid phase containing the less-volatile acid, which may be used anew.

If $A'H$ and $B'$ are respectively the volatile acid and volatile base constituents of the original salt and $AH$ the less-volatile acid, the latter will be used in an amount of at least one acid equivalent per $A'H$ acid equivalent of the $A'H$, $B'$ salt and preferably in excess, for example 1.2 to 5 acid equivalents per $A'H$ acid equivalent of the $A'H$, $B'$ salt.

The above two steps may be illustrated as follows:

$$A'H, B' + AH \longrightarrow A'\overset{\uparrow}{H} + AH, B' \quad (I)$$
$$AH, B' \longrightarrow \overset{\uparrow}{B'} + AH \quad (II)$$

Sometimes $A'H$ or $AH$ is not stable and appears in the anhydride form, for example sulfur dioxide or carbon dioxide.

The above schemes I and II are not representative of the relative amounts of $A'H$ and $B'$ in the salt $A'H$, $B'$, since, if $A'H$ is a n-valent acid, n-salts will be possible according to the number of salified acid groups. This, of course, also applies to the $B'$ base.

The solvent which is present in the liquid phase, at least for the first step, may be an alcohol of six to 50 carbon atoms, a polyalcohol of two to 50 carbon atoms and two to 10 OH-groups, preferably two to five OH-groups per molecule, as well as the esters and/or ethers thereof and the polyglycol compounds of the formula:

$$R_1-O-(R_2-O)_n-R_3 \quad (1)$$

in which $R_1$ and $R_3$ are hydrogen, monovalent hydrocarbon radicals of one to 20 and preferably one to 5 carbon atoms, or monovalent $R'$—CO-groups where $R'$ is a monovalent hydrocarbon group, particularly alkyl, of one to 20 and preferably one to five carbon atoms.

Each of $R_2$ is a bivalent hydrocarbon group of two to 10 and preferably two to five carbon atoms, for example a linear or branched alkylene group.

$n$ is an integer from 2 to 50 and preferably from 3 to 20.

A preferred group of polyalcohols and their esters and/or ethers conforms to the following formula:

$$R_1-O-R_2-O-R_3 \quad (2)$$

INn which $R_1$, $R_2$, and $R_3$ are as herebefore defined.

Specific solvents are mentioned hereafter, by way of examples: ethylene glycol, diethylene glycol, triethylene glycol, polyethylene glycol of molecular weight 400, propylene glycol, tripropylene glycol, hexylene glycol, octylene glycol, diethylene glycol diethyl ether, dipropylene glycol monobutyl ether, 2-methoxy-ethyl acetate, triethylene glycol monomethyl ether mono-acetate, 2-(2'butoxyethoxy)-ethyl acetate, octanol, glycerol, heptyl acetate.

The liquid phase may contain one or more of the above solvents, optionally together with other conventional solvents such as water, sulfoxides, sulfones or saturated, olefinic or aromatic hydrocarbons having, for example, from five to 20 carbon atoms.

Preferably the liquid phase contains at least 10 percent by weight of at least one of the solvents of the alcohol, polyalcohol or polyalkylene glycol type, more preferably at least 40 percent by weight.

This process has a wide use, and may be employed, for example, when at least one of the components of a salt which, otherwise, would be rejected, is to be recovered.

A particular example is the recovery of ammonia from its sulfitic and bisulfitic combinations. A known process for purifying fumes containing sulfur dioxide consists of injecting ammonia in the fumes and recovering a mixture of ammonium sulfite and bisulfite. Since the latter have but a few uses, the cost of the operation is essentially dependent on the ammonia consumption. Thus an important improvement to this process consists of recovering ammonia and sulfur dioxide from the mixture of ammonium sulfite and bisulfite. This treatment will be described hereinafter, as a particular embodiment of the invention.

It consists of adding to the ammonium sulfite and bisulfite mixture at least one $AH$ acid which is less volatile than sulfur dioxide and is able to form with ammonia a compound which is more stable than ammonium sulfite or bisulfite, this compound decomposing at a higher temperature than ammonium sulfite or bisulfite.

By heating at a temperature which is sufficient for decomposing ammonium sulfite or bisulfite, however insufficient for decomposing the ammonium salt of the $AH$ acid, the dissociation equilibrium is displaced as follows (as shown for the sulphite, by way of example):

$$(NH_4)_2 SO_3 \longrightarrow \overset{\rightarrow}{SO_2} + H_2O + 2NH_3$$
$$2AH, NH_3 \longleftarrow \underset{2\ AH}{\rule{2cm}{0.4pt}}$$

This broadly corresponds to the reaction 1 above.

In most of cases, this temperature is lower than 100° C. when operating under atmospheric pressure (for example 20° to 100° C.). The removal of sulfur dioxide may be improved by flashing with an inert gas, for example nitrogen or steam, or by pressure release.

The new ammonium salt of the nonvolatile acid $AH$ is then decomposed, preferably at a higher temperature, usually higher than 110° C., under atmospheric pressure, for example 120° to 130° C., with regeneration of the $AH$ acid and recovery of ammonia which may be reused for a new operation. It is of no use to operate above 170° C.

The reaction may be written as follows:

$$AH, NH_3 \longrightarrow N\overset{\uparrow}{H}_3 + AH$$

corresponding to the above (2) reaction.

Ammonia may be carried along by means of an inert gas, steam or a part of the fumes to be treated.

The less-volatile or nonvolatile $AH$ acid which may be used in this invention may be chosen amongst many acids, the only conditions being that it be less volatile than the $A'H$ acid of the starting salt, that it form with the $B'$ base not too stable a salt, and that its pK at 20° C. be at least 2.5 (by pK there is meant $-\log K$, where K is the acid dissociation constant). For example, the $AH$ acid may be selected amongst the following:

A—The weak mono- or polycarboxylic acids of the following types:

1. saturated or unsaturated aliphatic acids having two to 25 and preferably five to 10 carbon atoms;

2. saturated or unsaturated cycloaliphatic acids having four to 30 and preferably six to 12 carbon atoms;

3. aromatic acids having seven to 30 and preferably seven to 12 carbon atoms;

4. heterocyclic acids having four to 30 and preferably four to 10 carbon atoms and one to five heteroatoms such as O, S, N.

B—The weak inorganic mono- or polyacids.

The above definitions of the AH acids include more particularly the acids having one to five acid groups and optionally substituents, for example one to five substituents such as alkyl, cycloalkyl, aryl, alkenyl, alkyloxy and aryloxy preferably having one to 10 carbon atoms, and/or groups or atoms, for example one to five groups or atoms such as alcohol, thiol, ether, aldehyde, ketone, amine, nitro and halogen, for example chlorine, fluorine or bromine.

When the acid of the A and B types has several acid groups, it is sufficient that only one of these be free, the others being optionally salified or esterified.

By weak acid, there is meant an acid whose acid group(s) has (have) a pK of at least 2.5 at 20° C.

The following acids may be mentioned by way of examples: pentanoic, valeric, caproic, 2-chloro butanoic, chloro-acetic, cyclohexy-lacetic, adipic, sebacic, 2, 6, 6-heptane tricarboxylic, 4-pentenoic, 3-pentynoic, cis and transcinnamic, glutaconic, methyl mono-succinate, cyclopentane carboxylic, cyclohexane carboxylic, 1.3-cyclohexane dicarboxylic, 4-chloro cyclohexane carboxylic, decahydronaphthalene carboxylic, 2-phenyl cyclohexane carboxylic, cyclohexene carboxylic, 2-hydroxy cyclohexane carboxylic, benzoic, orthomethyl benzoic, ortho-isopropyl benzoic, para-ethyl benzoic, ortho-phenyl benzoic, meta-methoxy benzoic, ortho-phenoxy benzoic, para-acetyl benzoic, ortho-chloro benzoic, para-nitro benzoic, para-chloro benzoic, ortho-amino benzoic, salicylic, para-amino-salicylic, 2,6-dimethyl benzoic, ortho-phthalic isophthalic, terephthalic, ammonium hydrogen phthalate, naphthoic, 2-furan carboxylic, 2-tetrahydrofuran carboxylic, 2-thiophene carboxylic, 4-pyran carboxylic, 3-pyridine carboxylic, 5-methyl-2-pyridin carboxylic, 4-quinoline carboxylic, boric acid, ammonium dihydrogen phosphate, diammonium hydrogen phosphate.

Mixtures of these acids may also be used.

The liquid phase usually will contain 1 to 50 percent and preferably 10 to 35 percent by weight of nonvolatile acid or derivative. It may also contain up to 50 percent by weight of water, or even more. As a minimum the liquid phase will contain at least 0.1 g./liter of this acid or derivative in the dissolved state. If desired, the liquid phase of the first step may be different from that of the second step; for example the former may contain water and the latter less water or no water.

The volatile B' base may be ammonia or a primary, secondary or tertiary amine of low boiling point, preferably lower than 200° C. at 760 mm. Hg, or which may be carried along with steam, for example monomethylamine, diethylamine, n-butylamine, n-hexylamine, n-octylamine, cyclohexylamine or aniline.

As weak volatile acids of the A'H type, the following may be mentioned: hydrogen sulfide, hydrocyanic acid, formic acid, acetic acid, carbon dioxide, sulfur dioxide or hydrogen fluoride.

The following compounds given by way of examples, may be treated by the process of this invention: ammonium sulfides, ammonium cyanide, ammonium formate, ammonium acetate, ammonium carbonates, ammonium sulfites, ammonium fluoride, dimethylamine carbonate, monoethylamine acetate and trimethylamine carbonate.

The nonvolatile AH acid or derivative will be so chosen as to have a boiling or sublimation point substantially higher than that of the volatile A'H acid, for example at least 50° C. higher at 760 mm. Hg.

The process of this invention may be worked in any kind of apparatus. For example, for the first step, there will be used a column in which the starting salt to be decomposed will be introduced, as well as the acid AH, this salt being used in the solid state (either dry or suspended in a liquid), in the dissolved state, optionally dissociated, for example an aqueous solution of ammonium sulfite or bisulfite, or in the form of a gaseous mixture, such as $SO_2$ admixed with $NH_3$ and steam, resulting from the thermal decomposition of the salt.

The apparatus for the second step may be either identical or not to that of the first step.

The process of this invention may be carried out continuously, if desired. In the opposite case, the reactions 1 and 2 may take place in the same apparatus.

Irrespective of the chosen embodiment, i.e., either continuous or not, the temperature and pressure will be so chosen as
1. to recover the volatile A'H acid substantially free of volatile B' base during the first step,
2. to regenerate the liquid phase containing the AH acid by substantially quantitative release of the B' base with which the latter was combined during the second step, without release of AH acid.

When the pressure is the same in the two steps, for example, the second step is worked at a temperature at least 10° C. higher than the first step. The temperatures are obviously dependent on the pressure and the nature of the salt subjected to the treatment. As a rule, the first step may be carried out at about 20° to 120° C. and the second step at about 90° to 160° C.

With ammonium sulfide, for example, room temperature or slightly above will be sufficient in most of cases, under normal pressure, during the first step. With ammonium sulfite or bisulfite, a higher temperature is usually necessary, however not above 100° C. (for example 40° to 100° C.). In the two cases, the release of $NH_3$ of the second step may be carried out at a temperature above 110° C. under normal pressure, for example 110-150° C. Pressures of about 0.2 to 5 atmospheres may be used.

This is of interest since, with a sulfite or bisulfite, for example, the release of $SO_2$ may be carried out at a low temperature, thus avoiding the formation of such byproducts as sulfates which would lower the yield of the process.

Heat may be supplied by any means, for example steam injection, the latter also carrying away the volatile base or acid.

The invention will be described hereinafter with reference to the accompanying drawing relating to a unit for treating fumes containing sulfur dioxide by means of ammonia. The resulting mixture of ammonium sulfite and bisulfite is treated for recovering ammonia and, if desired, sulfur dioxide.

The fumes are introduced through chimney 1 into the enclosure A wherein it is contacted with ammonia from pipe 2. The purified fume is rejected through chimney 3. The resulting mixture of ammonium sulfite and bisulfite, either aqueous or dry, or even dissociated, is passed through pipe 4 into the regeneration column B, for example a packed column or a column fit with perforated trays at the top of which a liquid phase is injected from pipe 5, said phase containing at least one nonvolatile acid, for example benzoic acid, and at least one solvent, for example triethylene glycol monomethyl ether. The temperature is about 95° C. at the bottom and 70° C. at the top.

A gas, for example nitrogen or steam, is injected through pipe 6 to carry away sulfur dioxide. The resulting gas, containing sulfur dioxide, nitrogen or steam and, in some cases, traces of ammonia, escapes through pipe 7. It is cooled down in cooler D and the condensed vapors are collected in E. Sulfur dioxide is collected in pipe 8. The condensed liquid, which contains a small amount of ammonium sulfite and bisulfite, is advantageously recycled through pipe 9 to column B.

The new AH, B' salt, for example ammonium benzoate, which has been formed in the liquid phase containing the glycol compound, is withdrawn from the bottom of column B, and is thereafter passed through pipe 10 to the regeneration column C which may be identical to B and is maintained at 130° C. From the bottom thereof, through pipe 2, a part of the fume to be treated or any other sweeping gas is injected under sufficient pressure. The gaseous mixture, which contains ammonia, is recycled through pipe 2 to the enclosure A in which ammonia combines with a new amount of sulfur dioxide. As to the liquid phase containing the regenerated benzoic acid, it is recycled to the top of column B through pipe 5.

The above unit may be used, of course, to purify fumes containing, in addition to or instead of sulfur dioxide, other acidic components such as, for example, $H_2S$ and/or HCN.

The process of this invention, which is worked in apparatuses B and C, may also be used to treat other salts then sulfites and bisulfites, irrespective of the origin of these salts.

The following, nonlimitative examples, are illustrative of this invention.

EXAMPLE I 0.196 mole of $NH_4H_2PO_4$ are added to 100 cc. of an aqueous solution of tripropylene-glycol containing 40 percent by weight of water and 10 g. of $HNH_4S$ (0.196 mole). By heating up to 80° C., $H_2S$ is evolved. By a further heating to 120° C., ammonia which was present in the form of $PO_4H(NH_4)_2$, is evolved and water distills. The regenerated $PO_4H_2NH_4$ may be used to treat a new charge. The two steps are carried out under normal atmospheric pressure.

EXAMPLE II 30 g. (0.246 mole) of benzoic acid dissolved in 100 cc. of triethylene glycol monoethyl ether are added to 50 cc. of an aqueous solution of ammonium sulfite and bisulfite, containing 0.15 mole of $SO_2$ and 0.2 mole of $NH_3$. By heating up to 90° C., $SO_2$ escapes in a few minutes. Benzoic acid is thereafter regenerated by heating to 130° C. the solution containing ammonium benzoate.

EXAMPLE III

Example II is repeated except that 0.246 mole of salicylic acid are used, instead of benzoic acid. The results remain substantially unchanged.

EXAMPLE IV

Example II is repeated with 30 g. of benzoic acid dissolved in 100 cc. of tetraethylene-glycol monoacetate. The results remain unchanged.

EXAMPLE V

Example II is repeated with 30 g. of salicylic acid dissolved in 100 cc. of a polyalkylene glycol of an average molecular weight of 400, resulting from the polycondensation of a mixture of ethylene oxide and propylene oxide. The results are the same as in Example II.

EXAMPLE VI

Example II is repeated with 30 g. of benzoic acid dissolved in 100 cc. of a mixture of 60 percent by weight of polyethylene glycol of a molecular weight of 400 and 40 percent by weight of tetramethylene sulfone. The results are the same as those of Example II.

EXAMPLE VII

Example VI is repeated, using as solvent a mixture of 10 percent by weight of water with 90 percent by weight of polyethyleneglycol of a molecular weight of 400. The results are substantially the same as those of Example VI.

EXAMPLE VIII 0.4 mole of boric acid dissolved in 200 cc. of a mixture of 80 percent by weight of diethylene glycol and 20 percent by weight of glycerol are added to 50 cc. of an aqueous solution of ammonium sulfides (0.2 mole of $H_2S$ and 0.3 mole of $NH_3$). By heating up to 70° C., hydrogen sulfide escapes from the mixture while ammonium borate forms. By a further heating to 130° C., ammonium borate decomposes and water distills, thus carrying away the formed ammonia.

EXAMPLE IX

Example VIII is repeated with 0.4 mole of butyric acid dissolved in 200 cc. of tetraethylene glycol. The results remain unchanged.

EXAMPLE X 0.22 mole of cyclohexane-carboxylic acid dissolved in 130 cc. of a mixture of 80 percent by weight of tetraethylene glycol and 20 percent of water are added to 50 cc. of an aqueous solution of ammonium carbonates (0.1 mole of $CO_2$ and 0.15 mole of $NH_3$).

By heating up to 80° C., carbon dioxide escapes. By a further heating to 120° C., ammonia escapes and is carried along with steam, thus resulting in regenerated cyclohexane-carboxylic acid.

EXAMPLE XI

Example II is repeated, except that 0.246 mole of nicotinic acid are used instead of benzoic acid. The results are substantially the same as those of Example II.

EXAMPLE XII

Example VIII is repeated, except that water is substituted for the mixture of diethylene-glycol and glycerol.

The first step is carried out at 70° C., resulting in an easy evolution of hydrogen sulfide. On the contrary, a quantitative evolution of ammonia at 130° C. is only obtained with a complete vaporization of water, which is very costly. To avoid such a vaporization, it is possible to work under pressure but, in that case, the recovery of ammonia is no more quantitative.

EXAMPLE XIII

In this comparative example, benzoic acid is substituted with a strong mineral acid such as sulfuric acid.

The operating conditions are those of Example II. The results of the first step are the same as those of Example II. However it is not possible to dissociate ammonium sulfate during the second step, except above 300° C., without possible isolation of ammonia.

What is claimed as this invention is:

1. A process for separating ammonia, and a weak volatile acid selected from the group consisting of hydrogen sulfide, sulfur dioxide and carbon dioxide from salts or fluid dissociation products thereof comprising, in a first step, contacting said salt or dissociation product thereof of ammonia and a weak volatile acid, with a less volatile acid in the presence of at least one liquid phase, at a temperature of about 20° to 100° C. and under substantially atmospheric pressure to strip out the weak volatile acid in the form of a gas practically free of ammonia and said less volatile acid, and then, in a second step, varying the temperature and pressure conditions to liberate from resultant nongaseous residue the ammonia and regenerate the less volatile acid, said liquid phase containing a compound selected from the group consisting of a monohydric alcohol having from six to 50 carbon atoms per molecule; an ester of said alcohol, an ether of said alcohol; a polyalcohol having from two to 50 carbon atoms and two to 10 OH groups per molecule; an ester of said polyalcohol; an ether of said polyalcohol; a compound of the formula:

$$R_1-O-(R_2-O)_n-R_3$$

wherein each of $R_1$ and $R_3$ represents a radical selected from the group consisting of hydrogen atom, a monovalent hydrocarbon radical having one to 20 carbon atoms and a monovalent radical, R'CO in which R' is a monovalent hydrocarbon radical having one to 20 carbon atoms; $R_2$ is a bivalent hydrocarbon radical having two to 10 carbon atoms; and $n$ is an integer from two to 50; and mixtures thereof; said less-volatile acid having under normal atmospheric pressure a boiling or sublimation point at least 50° C. higher than that of said weak volatile acid, and having a pK at 20° C. of at least 2,5, K being the dissociation constant of ANY free acid group, said compound being present in said liquid phase in a concentration of at least 10 percent by weight.

2. A process according to claim 1, wherein the less-volatile acid is an inorganic acid.

3. A process according to claim 1, wherein the liquid phase contains at least 0.1 g./liter of the less-volatile acid in the dissolved state.

4. A process according to claim 3, wherein the less-volatile acid is a carboxylic acid of two to 30 carbon atoms.

5. A process according to claim 1, wherein said liquid phase contains such compound of The formula:

$$R_1-O-(R_2-O)_n-R_3.$$

6. A process according to claim 5, wherein each of $R_1$ and $R_3$ is selected from the group consisting of a hydrogen atom, a monovalent hydrocarbon radical of one to five carbon atoms and a monovalent radical R'CO in which R' is a monovalent hydrocarbon group having one to five carbon atoms, $R_2$ is a bivalent hydrocarbon radical of two to five carbon atoms and $n$ is an integer from 3 to 20.

7. A process according to claim 1, wherein said liquid phase contains triethylene glycol monoethyl ether.

8. A process according to claim 1, wherein ammonia is separated from a mixture comprising ammonium sulfite and ammonium bisulfite.

9. A process according to claim 1, wherein ammonia is separated from a salt selected from the group consisting of ammonium sulfide, ammonium carbonate, ammonium sulfite, and ammonium bisulfite.

10. A process according to claim 1, wherein said second step is conducted at Atmospheric pressure and at a temperature of at least 10° C. higher than that of the first step.

11. A process according to claim 8 wherein the second step is conducted at atmospheric pressure and at 110°-150° C.

12. A process according to claim 1, wherein said less-volatile acid is selected from the group consisting of an aliphatic carboxylic acid of five to 10 carbon atoms, a cycloaliphatic carboxylic acid of six to 12 carbon atoms, an aromatic carbocyclic carboxylic acid of seven to 12 carbon atoms, a heterocyclic carboxylic acid of four to 10 carbon atoms and one to five heteroatoms, and a weak inorganic acid.

13. A process according to claim 1, wherein said less-volatile acid is selected from the group consisting of benzoic acid, salicylic acid and nicotinic acid.

14. A process according to claim 13, wherein said liquid phase contains triethylene glycol monoethyl ether.

15. A process according to claim 1, said compound being present in said liquid phase in a concentration of at least 40 percent by weight.

* * * * *

UNITED STATES PATENT OFFICE
CERTIFICATE OF CORRECTION

Patent No. 3,649,190　　　　　　　　Dated　　March 14, 1972

Inventor(s)　　　Deschamps et al

It is certified that error appears in the above-identified patent and that said Letters Patent are hereby corrected as shown below:

In the Abstract:

Line 10, "(B)" should be ---(B')---;

Line 12, second occurrence, "ester" should be ---ether---;

Line 15, second occurrence, "ester" should be ---ether---;

Line 16, second occurrence, "ester" should be ---ether---.

In the Specification:

Column 2, in the first formula, "$\overrightarrow{SO}_2$" should be ---$\overset{\uparrow}{S}O_2$---.

Signed and sealed this 20th day of March 1973.

(SEAL)
Attest:

EDWARD M. FLETCHER, JR.　　　　　　　ROBERT GOTTSCHALK
Attesting Officer　　　　　　　　　　Commissioner of Patents